United States Patent [19]

Schoen

[11] 4,273,465
[45] Jun. 16, 1981

[54] PIPE CLAMP

[76] Inventor: Otmar Schoen, Am Kirschenberg 5, D 6601 Scheidterberg 5, Fed. Rep. of Germany

[21] Appl. No.: 64,517

[22] Filed: Aug. 7, 1979

[30] Foreign Application Priority Data

Aug. 29, 1978 [DE] Fed. Rep. of Germany ... 7825626[U]

[51] Int. Cl.³ ............................ F16B 7/02; F16L 3/22
[52] U.S. Cl. .................................... 403/391; 403/389; 248/67.5; 248/68 CB; 285/373; 285/419
[58] Field of Search ............... 403/391, 389; 248/67.5, 248/68 CB; 285/373, 419; 174/155–157

[56] References Cited

U.S. PATENT DOCUMENTS

| 1,566,153 | 12/1925 | McMunn | 403/391 |
| 2,417,260 | 3/1947 | Morehouse . | |
| 3,087,009 | 4/1963 | Blanchet | 248/68 CB |
| 3,592,427 | 7/1971 | Misuraca . | |
| 3,856,244 | 12/1974 | Menshen | 248/67.5 |
| 4,171,838 | 10/1979 | Grundy | 403/391 X |

FOREIGN PATENT DOCUMENTS

| 304155 | 3/1955 | Switzerland | 403/391 |
| 544618 | 4/1942 | United Kingdom | 248/68 CB |

Primary Examiner—James Kee Chi
Attorney, Agent, or Firm—Roylance, Abrams, Berdo & Farley

[57] ABSTRACT

An apparatus for clamping two side-by-side pipes together comprising two recessed holding bodies receiving the pipes therein, two clamping elements having the holding bodies therebetween and a screw interconnecting these four members. Interlocking projections and indentations on one of the clamping elements and its adjacent holding body prevent relative rotation during tightening of the screw.

9 Claims, 6 Drawing Figures

PIPE CLAMP

FIELD OF THE INVENTION

The present invention relates to a clamp for fastening two side-by-side pipes together, and, more particularly, the invention relates to such a clamp having two recessed holding bodies receiving the pipes therein, two clamping elements having the holding bodies therebetween and a screw interconnecting these four members together. Interlocking projections and indentations prevent relative rotation of one of the clamping elements and one of the holding bodies during tightening of the screw.

PRIOR ART

It is known in the art to provide a clip for two side-by-side pipes comprising two opposed holding bodies having a pair of semi-circular recesses in each which receive the pipes therein, two clamping elements having the holding bodies therebetween and a fastening device for coupling these four members together to provide a rigid clamp. The fastening device is conventionally a screw having an enlarged head resting on the outside of one of the clamping elements and received in a threaded bore in the other clamping element, the two holding bodies having a central apertures therein for the screw.

However, this type of pipe clamp is difficult to use since on tightening of the screw the clamping element fitting against the screw head tends to rotate relative to the adjacent holding body. In order to prevent his rotation, the clamping element must be held against the holding body. This results in a time consuming operation and one that requries extra effort by the clamp installer.

SUMMARY

Accordingly, it is a primary object of the present invention to provide a pipe clamp which prevents the rotation of the clamping element relative to the holding body during tightening of the screw without the requirement of fixedly holding the clamping element relative to the holding body.

This object is attained by providing a locking means located in the clamping element carrying the screw and on the adjacent holding body for preventing relative rotation therebetween. In particular, the locking means comprises a projection and an indentation on the clamping element and the adjacent holding body which interlock, thereby preventing relative rotation between these members.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

DETAILED DESCRIPTION

Figure 1:
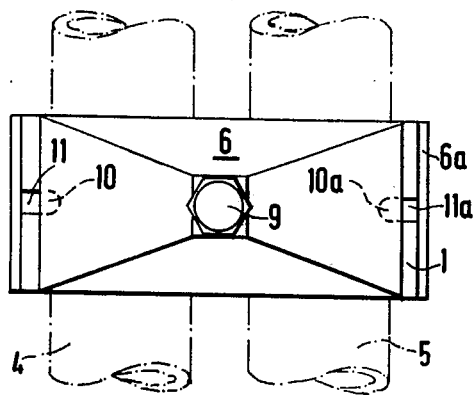
FIG. 1 is a top plan view of the pipe clamp in accordance with the present invention with the side-by-side pipes shown in phantom.
Figure 2:
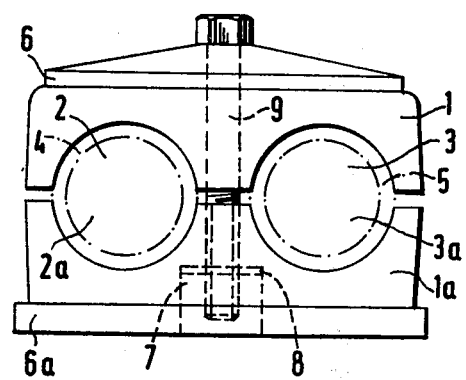
FIG. 2 is a front elevational view of the apparatus shown in FIG. 1.
Figure 3:
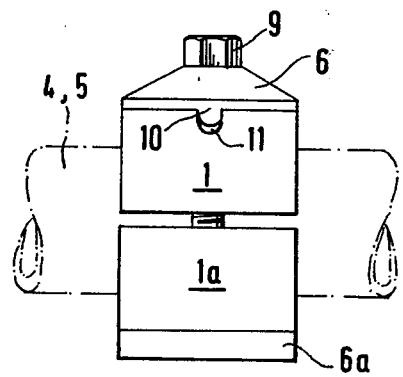
FIG. 3 is a side elevational view of the apparatus shown in FIG. 2.

Referring to the drawings in further detail, as seen in FIGS. 1-3, the pipe clamp of the present invention comprises two clamping elements 6, 6a, two recessed holding bodies 1, 1a and a fastening means in the form of a screw 9 coupling these four members together. Projections 10, 10a extending downwardly from clamping element 6 are received in indentations 11, 11a in the adjacent holding body 1 to lock these two parts together and prevent relative rotation therebetween.

In particular, the pipe clamp has two essentially identically formed holding bodies 1 and 1a made of an elastic material, such as plastic. The holding bodies 1, 1a are formed essentially as parallelopipeds and have two semicylindrical recesses 2 and 3 in body 1 and 2a and 3a in body 1a disposed side-by-side on the two facing sides of the holding bodies 1, 1a. When placed in the facing orientation shown in FIG. 2, the walls of these four recesses essentially form two cylindrical hollow spaces, disposed with parallel longitudinal axes, for the reception of the two bar or pipe-shaped bodies 4 and 5.

On the two sides of the holding bodies 1, 1a opposite the sides having the recesses, the two clamping elements 6, 6a are disposed. These clamping elements consist of a solid material, such as metal. The top clamping element 6 seen in FIG. 2 is formed in the manner of a hip roof having a truncated pyramid shape with rectangular top and bottom bases. The top smaller base lies on the side of the clamping element 6 away from the holding body 1. The clamping element 6 has the bottom, larger base slightly shorter than the width of the two holding bodies 1, 1a; whereas the clamping element 6a is formed as a flat rectangular plate which is slightly longer than both holding bodies 1, 1a. The plate-shaped lower clamping element 6a has rigidly secured in the center thereof an internally threaded nut 7, which projects into a central recess 8 in the bottom of holding body 1a. Although clamping element 6 is shown somewhat shorter than the holding bodies 1, 1a, that clamping element may also be formed of equal length as the holding bodies 1, 1a.

A fastening device in the form of a screw 9 having an enlarged head passes through central apertures in the clamping element 6 and the two holding bodies 1, 1a, the enlarged head of which rests on the smaller, top base of the clamping element 6. The threads on the screw 9 are threadably received in the nut 7 rigidly coupled to clamping element 6a. The screw 9 is disposed between the recesses 2, 2a on the one hand and 3, 3a on the other in the central apertures set forth above. The screw 9 is also perpendicular to the clamping elements 6, 6a.

In the assembled state, shown in the drawings, with pipe-shaped bodies 4, 5 interposed between the holding bodies, there is a slight spacing between the facing sides of the holding bodies.

The clamping element 6 on its bottom, large base faces the holding body 1 and in the area of its narrow-side edges has two nose-like projections 10, 10a depending downwardly therefrom. Each of these projections fits into a corresponding indentation 11 and 11a on the top side of the holding body 1 facing the bottom of clamping element 6, as seen best in FIGS. 1 and 3. The rotation control or locking assembly formed by projections 10, 10a and indentations 11, 11a, is provided between the holding body 1 and the clamping element 6 to prevent a rotation therebetween during tightening of the screw 9 to rigidly fasten the clamping elements 6 and 6a with the holding bodies and pipes therebetween.

Although two projections are shown, only a single projection and interlocking indentation could be provided. However, because of the simplicity of the assembly of the pipe clamp, the symmetrical arrangement of two projections and two indentations is preferred.

The holding bodies 1, 1a may be identically formed, in which case they would each have a recess 8 therein. These holding bodies may also be formed of a somewhat hard material, such as aluminum.

In addition to the projections extending downwardly from the clamping element 6, the top of the holding body 1 can be provided with two upwardly extending projections, not shown, which would be received in corresponding indentations in the bottom of the clamping element 6. These indentations would be between on one side the projection 10 and the central aperture for screw 9 and on the other side the projection 10a and the central aperture for screw 9. In addition, these two indentations in the bottom of the clamping element 6 could extend to the narrow side edges of that element, thereby eliminating the downward projections 10 and 10a, and in this case, the projection from the holding body 1 would extend completely across that holding body and be received in the indentation across the full width of clamping element 6.

While advantageous embodiments have been chosen to illustrate the invention, it will be understood by those skilled in the art that various changes and modifications can be made therein without departing from the scope of the invention as defined in the appended claims.

Figure 4:
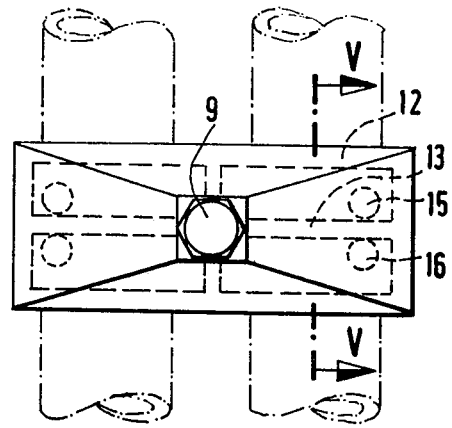
FIGS. 4 and 6 show another embodiment of the present invention in the same views as FIGS. 1 and 3.
Figure 5:
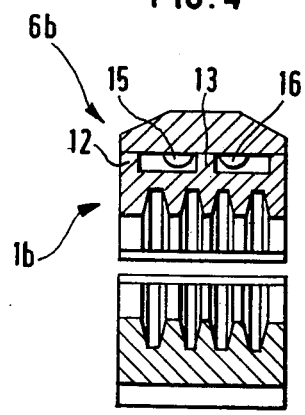
FIG. 5 is a partial section along line V—V in FIG. 4.
Figure 6:
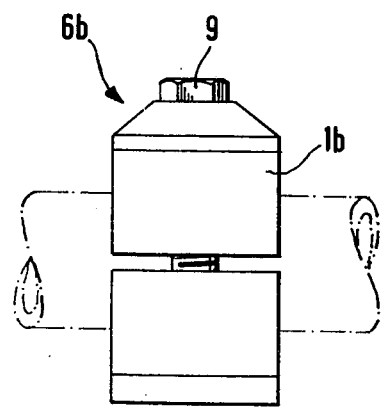

As seen in the FIGS. 4 to 6 the holding body 1b has a surrounding wall 12 on his upper side forming a cavity open to the clamping element 6b. In the middle of the cavity parallel to the long side of the holding body 1b extends a middle rib 13. This rib can prevent the rotation of the clamping element 6b relative to the holding body if the clamping element has two projections 15, 16 received in the cavity and receiving theirselves the middle rib 13. In each end of the clamping element 6b is arranged a pair of projections 15, 16. Only two are needed to prevent the rotation of the clamping element 6b.

What is claimed is:

1. In an apparatus for fastening two pipes together including two holding bodies, each having two recesses disposed therein in side-by-side relationship, said recesses in one of said holding bodies facing the recesses in the other of said holding bodies to thereby define two substantially circular receiving areas for the reception of the two pipes; two clamping elements enclosing said holding bodies therebetween; an attaching element penetrating said clamping elements and said holding bodies; first means on one of said clamping elements for supporting said attaching element; and a second means on the other of said clamping elements for releasably connecting said attaching element thereto via rotation, the improvement comprising:

locking means, located on said clamping element containing said first means and on the adjacent holding body, for preventing relative rotation therebetween, said locking means comprising
a rib extending in a cavity on the upper side of said adjacent holding body, and
two projections extending from the bottom side of said clamping element into said cavity and engaging said rib therebetween.

2. The improvement according to claim 1, wherein said rib has substantially planar, parallel upstanding sides.

3. The improvement according to claim 1, wherein said projections are substantially hemispherical beads.

4. The improvement according to claim 1, and further comprising
a second rib extending in a second cavity on the upper side of said holding body, and
third and fourth projections extending from the bottom side of said clamping element into said second cavity and engaging said second rib therebetween.

5. The improvement according to claim 4, wherein said two projections are adjacent one end of said clamping element and
said third and fourth projections are adjacent the other end of said clamping element.

6. The improvement according to claim 1, wherein said cavity is defined by an upstanding wall on the outer periphery of said holding body, and
said rib extends centrally of said cavity.

7. The improvement according to claim 6, wherein a plane containing the top of said upstanding wall also contains the top of said rib.

8. The improvement according to claim 1, wherein said cavity is significantly larger than said two projections.

9. In an apparatus for fastening two pipes together including two holding bodies, each having two recesses disposed therein in side-by-side relationship, said recesses in one of said holding bodies facing the recesses in the other of said holding bodies to thereby define two substantially circular receiving areas for the reception of the two pipes; two clamping elements enclosing said holding bodies therebetween; an attaching element penetrating said clamping element and said holding bodies; first means on one of said clamping elements for supporting said attaching element; and a second means on the other of said clamping elements for releasably connecting said attaching element thereto via rotation, the improvement comprising:

locking means, located on said clamping element containing said first means and on the adjacent holding body, for preventing relative rotation therebetween, said locking means comprising
wall means defining at least one cavity on the upper side of said adjacent holding body, and
two projections extending from the bottom side of said clamping element into said at least one cavity adjacent said wall means, the two projections contacting said wall means to prevent relative rotation between said clamping element and said adjacent holding body.

* * * * *